(12) United States Patent
Kim et al.

(10) Patent No.: US 10,908,721 B2
(45) Date of Patent: Feb. 2, 2021

(54) TOUCH DISPLAY PANEL AND TOUCH DISPLAY DEVICE FOR REMOVING DISPLAY NOISE FROM A TOUCH SENSING SIGNAL

(71) Applicant: LG Display Co., Ltd., Seoul (KR)

(72) Inventors: CheolSe Kim, Daegu (KR); JuHan Kim, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/455,206

(22) Filed: Jun. 27, 2019

(65) Prior Publication Data
US 2020/0004368 A1    Jan. 2, 2020

(30) Foreign Application Priority Data
Jun. 29, 2018 (KR) .................. 10-2018-0075651

(51) Int. Cl.
*G06F 3/041* (2006.01)

(52) U.S. Cl.
CPC ........ *G06F 3/0412* (2013.01); *G06F 3/04164* (2019.05)

(58) Field of Classification Search
CPC .. G06F 3/0412; G06F 3/04164; G06F 3/0446; G06F 3/0443; G06F 3/044; G06F 2203/04107; G06F 2203/04111
See application file for complete search history.

(56) References Cited

U.S. PATENT DOCUMENTS

| | | | |
|---|---|---|---|
| 2016/0132148 A1* | 5/2016 | Han | G06F 3/0443 345/174 |
| 2016/0283000 A1* | 9/2016 | Wang | G06F 3/0443 |
| 2016/0378224 A1* | 12/2016 | Kwon | G06F 3/0445 345/174 |
| 2017/0315657 A1* | 11/2017 | Lai | G06F 3/041662 |
| 2017/0329444 A1 | 11/2017 | Hwang et al. | |
| 2018/0145114 A1 | 5/2018 | Sim et al. | |
| 2018/0356924 A1* | 12/2018 | Hsieh | G02F 1/13458 |
| 2019/0302959 A1* | 10/2019 | Clark | G06F 3/0412 |

FOREIGN PATENT DOCUMENTS

EP    2 267 791 A2    12/2010

OTHER PUBLICATIONS

European Search Report issued in European Patent Application No. 19183043.9 dated Oct. 14, 2019. (9 pages).

\* cited by examiner

*Primary Examiner* — Ryan A Lubit
(74) *Attorney, Agent, or Firm* — Polsinelli PC

(57) ABSTRACT

A touch display panel and a touch display device. A shield electrode is disposed between a display electrode and touch electrodes, is driven using a signal corresponding to a signal applied to the touch electrodes. Display noise is blocked using the shield electrode, so that the sensitivity of touch sensing signals received from the touch electrodes are improved. In addition, due to the improved sensitivity of touch sensing signals, the performance of touch sensing based on a change in the self-capacitance of the touch electrodes is improved. Both a touch sensing function based on a change in the self-capacitance of the touch electrodes and a touch sensing function based on a change in the mutual capacitance of the touch electrodes are provided.

9 Claims, 23 Drawing Sheets

TOUCH DISPLAY PANEL AND TOUCH DISPLAY DEVICE FOR REMOVING DISPLAY NOISE FROM A TOUCH SENSING SIGNAL

CROSS REFERENCE TO RELATED APPLICATION

This application claims priority to Korean Patent Application No. 10-2018-0075651, filed on Jun. 29, 2018, which is hereby incorporated by reference in its entirety and for all purposes as if fully set forth herein.

BACKGROUND

Field

Exemplary embodiments relate to a touch display panel and a touch display device.

Description of Related Art

In response to the development of the information society, demand for various types of display devices for displaying images is increasing. In this regard, a range of display devices, such as liquid crystal display (LCD) devices and organic light-emitting diode (OLED) display devices, have recently come into widespread use.

Such a display device has a touch-based user interface to recognize a user's touch made to a display panel and perform input processing based on the recognized touch in order to provide a greater variety of functions.

For example, a display device able to recognize touches can apply a touch driving signal to touch electrodes disposed on or in a display panel and detect a change in capacitance generated by a user's touch, thereby determining whether or not the display panel has been touched and detecting touch coordinates and the like.

However, the display panel providing such a touch recognition function has a variety of components disposed therein, such as electrodes, signal lines, and the like, to which a variety of display driving voltages, signals, and the like are applied. Accordingly, the performance of the touch sensing function may be degraded by parasitic capacitance generated between a display electrode and a touch electrode.

BRIEF SUMMARY

Various aspects of the present disclosure provide a touch display panel and device and a driving method thereof able to improve touch sensing performance by removing display noise from a touch sensing signal received from a touch electrode.

Also provided are a touch display panel and device and a driving method thereof able to improve the accuracy of a touch sensing signal based on a change in the self-capacitance of a touch electrode.

Also provided are a touch display panel and device and a driving method thereof able to recognize a touch by detecting a change in at least one of self-capacitance and mutual capacitance of a touch electrode.

According to an aspect of the present disclosure, a touch display device may include: a display electrode to which a display driving voltage is applied; and a plurality of touch electrodes, located on the display electrode, and to which a touch driving signal is applied.

The touch display device may further include a shield electrode, disposed between the display electrode and the plurality of touch electrodes, and to which a shield signal corresponding to the touch driving signal is applied during a period of time in which the touch driving signal is applied to at least one touch electrode among the plurality of touch electrodes.

According to another aspect of the present disclosure, a touch display device may include: a display electrode to which a display driving voltage is applied; a plurality of first touch electrodes located on and/or above the display electrode and the plurality of first touch electrodes are connected to each other in a first direction; a plurality of second touch electrodes located on the display electrode and the plurality of second touch electrodes are connected to each other in a second direction intersecting the first direction; and a driver circuit for driving the plurality of first touch electrodes and the plurality of second touch electrodes.

In the touch display device, the driver circuit may output a first touch driving signal to at least one first touch electrode among the plurality of first touch electrodes and receive a first touch sensing signal during a first period, and the driver circuit may output a second touch driving signal to at least one second touch electrode among the plurality of second touch electrodes and the driver circuit may receive a second touch sensing signal during a second period.

According to another aspect of the present disclosure, a touch display panel may include: a display electrode to which a display driving voltage is applied; an encapsulation layer disposed on the display electrode; at least one shield electrode disposed on the encapsulation layer; a plurality of touch electrodes located on the at least one shield electrode and insulated from the at least one shield electrode; and a driver circuit outputting a touch driving signal to at least one touch electrode among the plurality of touch electrodes and outputting a shield electrode driving signal, corresponding to the touch driving signal, to the at least one shield electrode.

According to exemplary embodiments, the shield electrode, to which a shield electrode driving signal corresponding to the touch driving signal is applied, is disposed between the display electrode and the touch electrodes to remove parasitic capacitance between the display electrode and the touch electrodes, so that display noise in a touch sensing signal can be reduced.

According to exemplary embodiments, since display noise in the touch sensing signal received from the touch electrodes is removed, the accuracy of touch sensing using the touch sensing signal generated based on a change in the self-capacitance of the touch electrodes can be improved.

According to exemplary embodiments, since the accuracy of touch sensing based on a change in the self-capacitance of the touch electrodes is improved, both a touch sensing function based on a change in the self-capacitance of the touch electrodes and a touch sensing function based on a change in the mutual capacitance of the touch electrodes can be provided.

BRIEF DESCRIPTION OF THE DRAWINGS

The above and other objects, features, and advantages of the present disclosure will be more clearly understood from the following detailed description when taken in conjunction with the accompanying drawings, in which.

DETAILED DESCRIPTION

Figure 1:
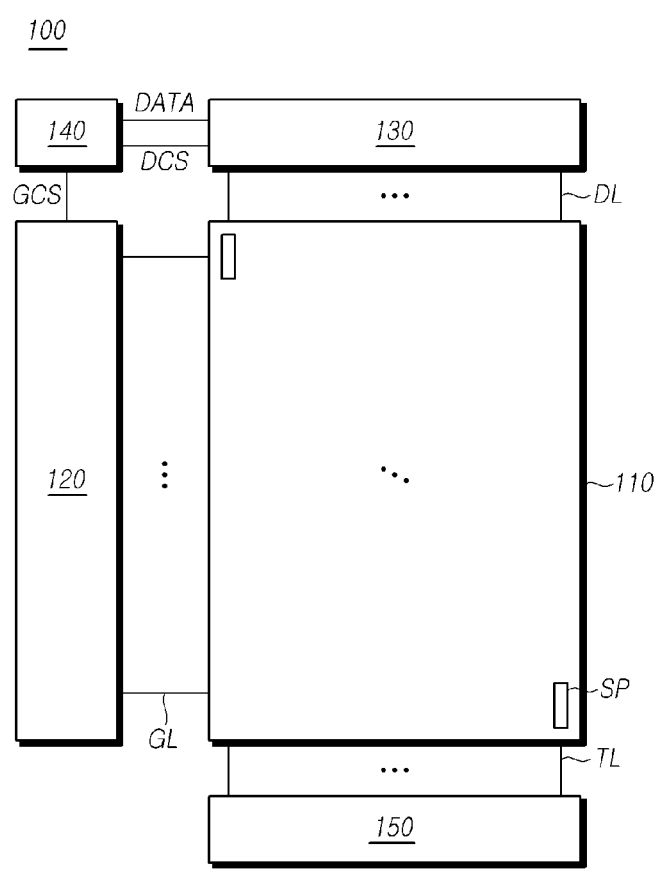
FIG. 1 illustrates a schematic configuration of a touch display device according to exemplary embodiments.

Hereinafter, reference will be made to embodiments of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

It will also be understood that, while terms, such as "first," "second," "A," "B," "(a)," and "(b)," may be used herein to describe various elements, such terms are merely used to distinguish one element from other elements. The substance, sequence, order, or number of such elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element.

FIG. 1 illustrates a schematic configuration of a touch display device 100 according to exemplary embodiments.

Referring to FIG. 1, the touch display device 100 according to exemplary embodiments may include a touch display panel 110, a gate driver circuit 120, a data driver circuit 130, and a controller 140. In addition, the touch display device 100 may include a touch driver circuit 150 to detect a touch made to the touch display panel 110.

A plurality of gate lines GL and a plurality of data lines DL are disposed in the touch display panel 110, and a plurality of subpixels, e.g., SP, are disposed in areas in which the gate lines GL and the data lines DL intersect.

In addition, a plurality of touch electrodes TE may be disposed or embedded in the touch display panel 110, and a plurality of touch lines TL may be disposed in the touch display panel 110 to electrically connect the touch electrodes TE and the touch driver circuit 150.

First, describing a configuration for display driving in the touch display device 100, the gate driver circuit 120 controls the driving timing of the subpixels SP disposed in the touch display panel 110. In addition, the data driver circuit 130 displays an image by supplying data voltages $V_{data}$, corresponding to image data, to the subpixels SP, so that the subpixels SP represent luminance levels corresponding to grayscales of the image data.

Specifically, the gate driver circuit 120 is controlled by the controller 140, and sequentially outputs a scanning signal to the plurality of gate lines GL disposed in the touch display panel 110 to control the driving timing of the plurality of subpixels SP.

The gate driver circuit 120 may include one or more gate driver integrated circuits (GDICs) and/or may include one or more processors. The GDICs may be disposed on one or both sides of the touch display panel 110, depending on the driving system. Alternatively, the gate driver circuit 120 may have a gate-in-panel (GIP) structure embedded in a bezel area of the touch display panel 110.

The data driver circuit 130 receives image data (or input data) from the controller 140, and converts image data into analog data voltages $V_{data}$. Then, the data driver circuit 130 outputs the data voltages $V_{data}$ to the data lines DL at points in time at which the scanning signal is applied to the gate lines GL, so that the subpixels SP represent luminance levels corresponding to image data.

The data driver circuit 130 may include one or more source driver integrated circuits (SDICs) and/or one or more processors.

The controller 140 supplies a variety of control signals to the gate driver circuit 120 and the data driver circuit 130 to control the operation of the gate driver circuit 120 and the data driver circuit 130.

The controller 140 controls the gate driver circuit 120 to output a scanning signal at points in time defined by frames. The controller 140 converts image data received from an external source into a data signal format readable by the data driver circuit 130, and outputs the converted image data to the data driver circuit 130.

The controller 140 may receive a variety of timing signals, including a vertical synchronization signal $V_{sync}$, a horizontal synchronization signal $H_{sync}$, an input data enable signal DE, and a clock signal CLK, in addition to the image data, from an external source (e.g. a host system).

The controller 140 may generate a variety of control signals using the variety of timing signals received from the external source and output the variety of control signals to the gate driver circuit 120 and the data driver circuit 130.

For example, the controller 140 outputs a variety of gate control signals, including a gate start pulse GSP, a gate shift clock GSC, a gate output enable signal GOE, and the like, to control the gate driver circuit 120.

Here, the gate start pulse GSP controls the operation start timing of one or more GDICs of the gate circuit 120. The gate shift clock GSC is a clock signal commonly input to the one or more GDICs to control the shift timing of scanning signals. The gate output enable signal GOE designates timing information of the one or more GDICs.

In addition, the controller 140 outputs a variety of data driving control signals, including a source start pulse SSP, a source sampling clock SSC, a source output enable signal SOE, and the like, to control the data driver circuit 130.

Here, the SSP controls the data sampling start timing of one or more SDICs of the data driver 120. The source sampling clock SSC is a clock signal controlling the sampling timing of data in each of the SDICs. The source output enable signal SOE controls the output timing of the data driver circuit 130.

The touch display device 100 may further include power management integrated circuit (PMIC) to supply various forms of voltage or current to the organic touch display panel 110, the gate driver circuit 120, the data driver circuit 130, the touch driver circuit 150, and the like, or control various forms of voltage or current to be supplied to the same.

The subpixels SP are defined by the gate lines GL and the data lines DL intersecting each other. Liquid crystal or light-emitting diodes (LEDs) may be disposed in the subpixels, depending on the type of the touch display device 100.

For example, in a case in which the touch display device 100 is an organic light-emitting display device, organic light-emitting diodes (OLEDs) are disposed in the subpixels SP. In addition, current flowing to the OLEDs may be controlled depending on the data voltage, so that the subpixels SP can represent brightness levels corresponding to the image data.

In addition, the touch display device 100 according to exemplary embodiments may detect a user's touch made to the touch display panel 110, using the touch electrodes TE provided in the touch display panel 110 and the touch driver circuit 150.

Figure 2:
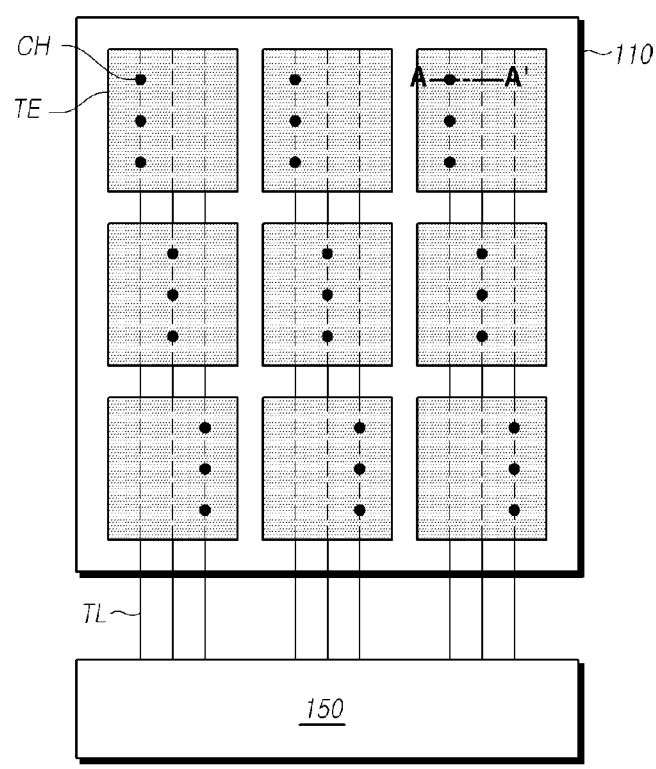
FIG. 2 illustrates an arrangement structure comprised of touch electrodes and a touch driver circuit in the touch display device according to exemplary embodiments.

FIG. 2 illustrates a structure comprised of touch electrodes TE and a touch driver circuit 150 in the touch display device 100 according to exemplary embodiments, in which the touch electrodes TE are disposed in the touch display panel 110, and the touch driver circuit 150 drives the touch electrodes TE to detect a touch.

Referring to FIG. 2, a plurality of touch electrodes TE, as well as a plurality of touch lines TL connecting the touch electrodes TE to the touch driver circuit 150, may be disposed in the touch display panel 110.

The touch electrodes TE may be disposed on or within the touch display panel 110. The touch electrodes TE may respectively be a transparent bulk electrode or an opaque mesh electrode. Alternatively, touch electrodes TE may respectively be a transparent or opaque electrode, and in this case, may have an open area, as required. That is, the open area may be present in at least a portion of the touch electrode TE. For example, an open area may be located in a portion of each of the subpixels SP, corresponding to a light-emitting area.

The touch electrodes TE may be connected to the touch driver circuit 150 via the touch lines TL disposed in the touch display panel 110.

The touch driver circuit 150 may include a touch sensing circuit connected to the touch electrodes TE via the touch lines TL and a touch controller controlling the touch sensing circuit and detecting an input corresponding to a touch. In addition, the touch driver circuit 150 may include a touch power circuit supplying a touch driving signal TDS to the touch sensing circuit under the control of the touch controller.

At least a portion of the touch driver circuit 150 may be integrated with the data driver circuit 130.

The touch sensing circuit outputs the touch driving signal TDS to the plurality of touch electrodes TE, under the control of the touch controller, and receives touch sensing signals TSS from the plurality of touch electrodes TE.

The touch sensing circuit may receive a touch sensing signal TSS from each of the touch electrodes TE via the touch lines TL connected to the touch electrodes TE in a one-to-one relationship.

That is, as illustrated in FIG. 2, the plurality of touch electrodes TE may be separated from each other, and the touch lines TL may be electrically connected to the touch lines TE via contact holes CH, respectively.

In addition, the touch sensing circuit may output a touch driving signal TDS to the touch electrodes TE via the touch lines TL and receive touch sensing signals TSS via the touch lines TL, thereby detecting a change in self-capacitance generated by a touch.

Alternatively, the touch electrodes may be divided into driving electrodes and sensing electrodes, and the touch sensing circuit may be connected to the driving electrodes and the sensing electrodes.

In this case, the touch sensing circuit may output a touch driving signal TDS to the driving electrodes and receive touch sensing signals TSS from the sensing electrodes, thereby detecting a change in mutual capacitance between the driving electrodes and the sensing electrodes generated by the touch.

The touch sensing circuit converts a received touch sensing signal TSS into digital sensing data and transfers the converted sensing data to the touch controller.

The touch controller may receive the sensing data from the touch sensing circuit and detect a user's touch made to the display panel 110, based on the received sensing data, while controlling the operation of the touch sensing circuit.

That is, the touch controller may detect a change in self-capacitance or a change in mutual capacitance from the sensing data, and based on the detected change in capacitance, determine whether or not the panel has been touched and detect touch coordinates and the like.

Here, since the touch electrodes TE are disposed on or in the touch display panel 110, parasitic capacitance Cp may be generated between display driving electrodes, included in the touch display panel 110, and the touch electrodes TE.

In addition, such parasitic capacitance Cp may have an effect on touch sensing signals received from the touch electrodes TE.

Figure 3A:
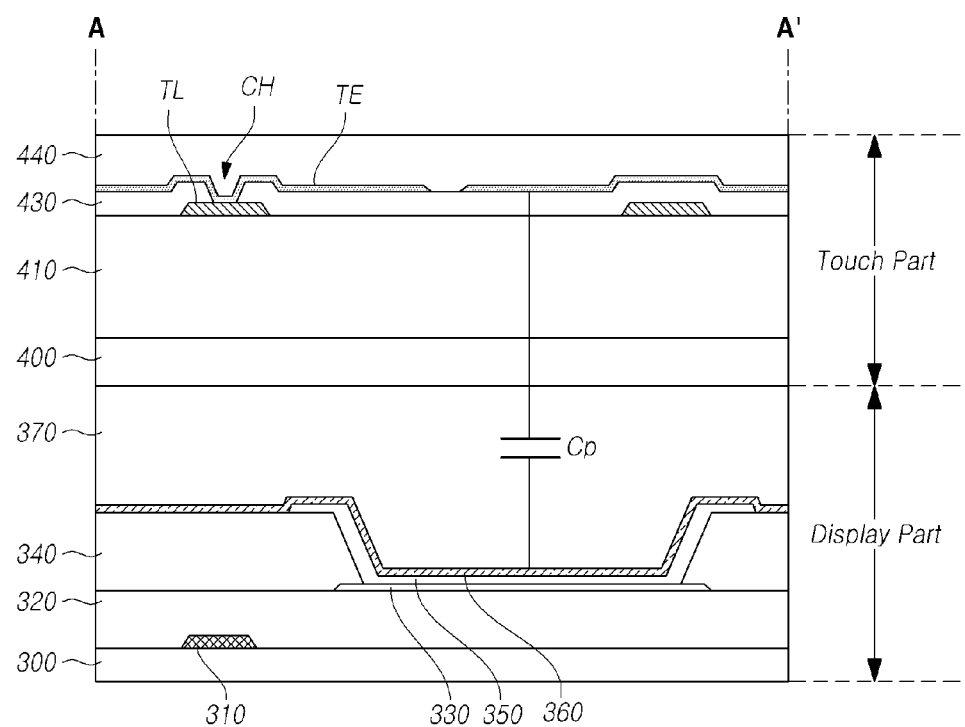
FIGS. 3A and 3B illustrate exemplary cross-sectional structures of portion A-A' of various touch display devices including those illustrated in FIG. 2.
Figure 3B:
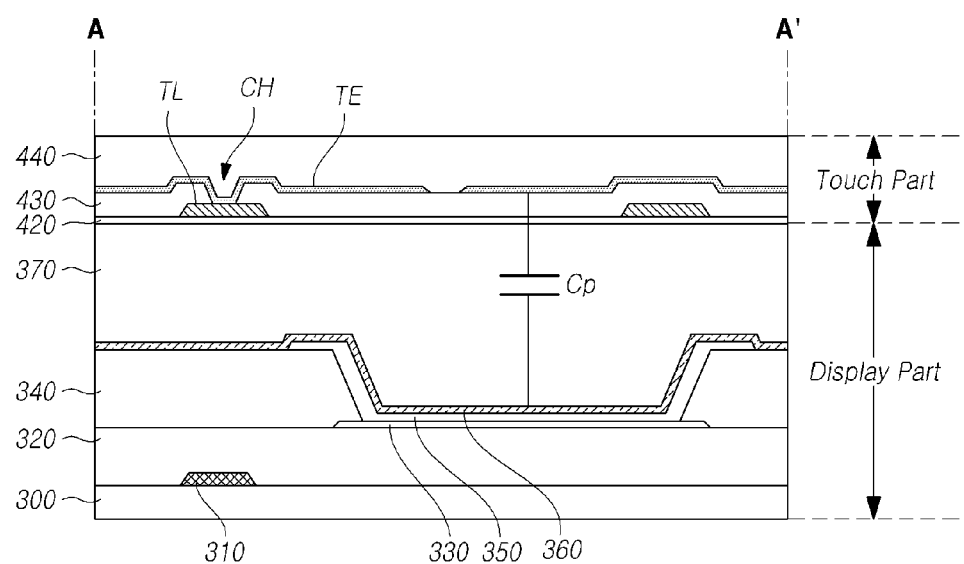

FIGS. 3A and 3B illustrate cross-sectional structures of portion A-A' of the touch display device 100 illustrated in FIG. 2, in which parasitic capacitance Cp is generated between a display electrode and a touch electrode TE.

In addition, the touch display device 100 according to exemplary embodiments is taken as an organic light-emitting diode (OLED) display device by way of example. FIG. 3A illustrates an exemplary structure in which the touch electrode TE is disposed in an on-cell structure, while FIG. 3B illustrates an exemplary structure in which the touch electrode TE is disposed in an in-cell structure.

Referring to FIG. 3A, a signal line 310, to which a display driving voltage, signal, or the like is applied, may be disposed on a display substrate 300, and a signal line insulating layer 320 may be disposed on the signal line 310.

A first electrode 330 may be disposed on the signal line insulating layer 320, and a bank 340 defining a light-emitting area may be provided. In addition, an organic light-emitting layer 350 may be disposed on the first electrode 330, and a second electrode 360 may be disposed on the organic light-emitting layer 350 and the bank 340.

Here, the first electrode 330 may be an anode, while the second electrode 360 may be a cathode. In addition, FIGS. 3A and 3B illustrate a top emission structure by way of example, in which the second electrode may be a transparent or translucent material. In addition, the touch display device 100 according to exemplary embodiments may have a bottom emission structure.

An encapsulation layer 370 may be disposed on the second electrode 360. The components, from the display substrate 300 to the encapsulation layer 370, may constitute a display part of the touch display device 100.

An adhesive layer 400 may be disposed on the display part, and a touch part providing a touch sensing function may be disposed on the adhesive layer 400.

The touch part may include a touch substrate 410, as well as a touch electrode TE and a touch line TL disposed on the touch substrate 410. In addition, the touch part may include a touch insulating layer 430, disposed between the touch electrode TE and the touch line TL, and a touch protective layer 440 disposed on the uppermost layer.

Due to the touch part attached to the top portion of the display part via the adhesive layer 400 as described above, the display panel 110 having touch sensing ability may be provided.

Alternatively, the touch electrode TE, the touch line TL, and the like may be disposed on the encapsulation layer 370 to provide the touch display panel 110 including an in-cell structure in which the touch electrode TE is disposed.

Referring to FIG. 3B, a touch buffer layer 420 is disposed on the encapsulation layer 370, and the touch line TL is disposed on the touch buffer layer 420. In addition, the touch insulating layer 430 is disposed on the touch line TL, and the touch electrode TE is disposed on the touch insulating layer 430.

The touch electrode TE may be electrically connected to the touch line TL via a contact hole CH formed in the touch insulating layer 430, and the touch protective layer 440 may be disposed on the touch electrode TE.

Since the touch electrode TE and the touch line TL are placed directly on the encapsulation layer 370 as described above, the touch display device 100 able to recognize touches can be easily provided.

Here, parasitic capacitance Cp may be generated between the second electrode 360, i.e. a display electrode of the display part, located closest to a touched portion, and the touch electrode TE. Such parasitic capacitance Cp may gradually increase with decreases in the thickness of the touch display panel 110.

In addition, parasitic capacitance Cp may cause noise in a touch sensing signal TSS received from the touch electrode TE. Such noise may have an adverse effect on touch sensing performance. In particular, if a change in the self-capacitance of the touch electrode TE is detected during touch recognition, a touch may be erroneously recognized.

The touch display device 100 according to exemplary embodiments can reduce display noise in the touch sensing signal, caused by parasitic capacitance Cp between the display electrode and the touch electrode TE, such that the touch display panel 110 and the touch display device 100 can be designed to have a compact structure while achieving improved accuracy of touch sensing.

Figure 4:
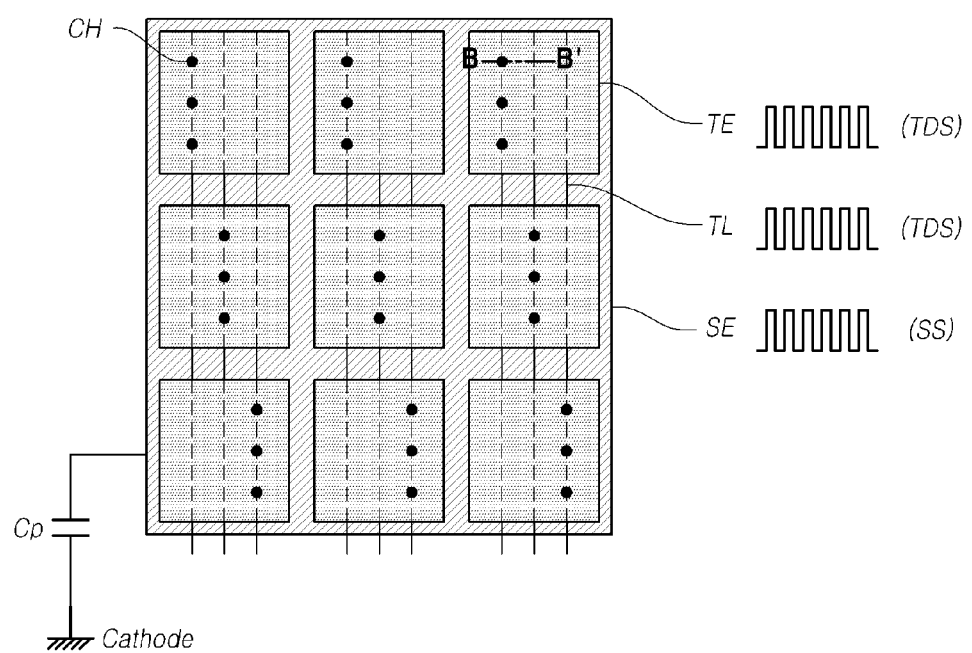
FIG. 4 illustrates an arrangement structure of touch electrodes and a shield electrode in the touch display device according to exemplary embodiments.

FIG. 4 illustrates a structure for reducing display noise in touch sensing signals TSS in the touch display device 100 according to exemplary embodiments, in which touch electrodes TE for touch sensing and a shield electrode SE for noise reduction are arranged in the touch display panel 110.

Referring to FIG. 4, the touch display panel 110 according to exemplary embodiments may include a plurality of touch electrodes TE and a plurality of touch lines TL electrically connected to the plurality of touch electrodes TE. In addition, the touch display panel 110 may further include electrodes, lines, and the like, disposed below the touch electrodes TE and the touch lines TL, and to which display driving voltages and signals are applied.

In addition, the touch display panel 110 may include the shield electrode SE disposed between a display electrode, to which a display driving voltage or the like is applied, and the touch electrodes TE.

Figure 5A:
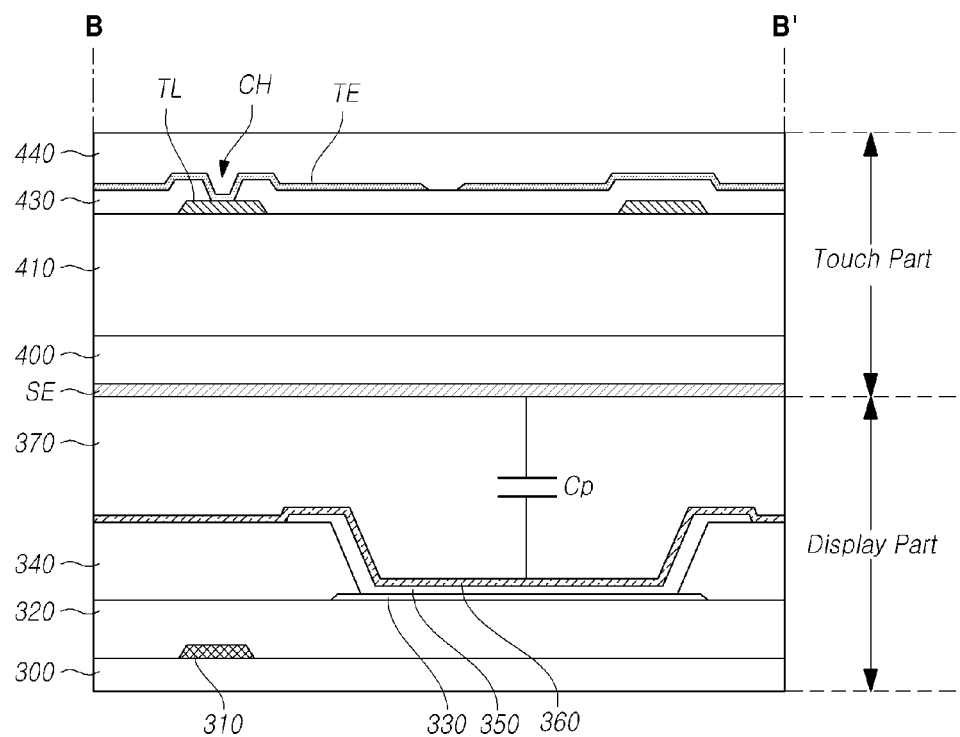
FIGS. 5A to 5C illustrate exemplary cross-sectional structures of portion B-B' of various touch display devices including those illustrated in FIG. 4.
Figure 5B:
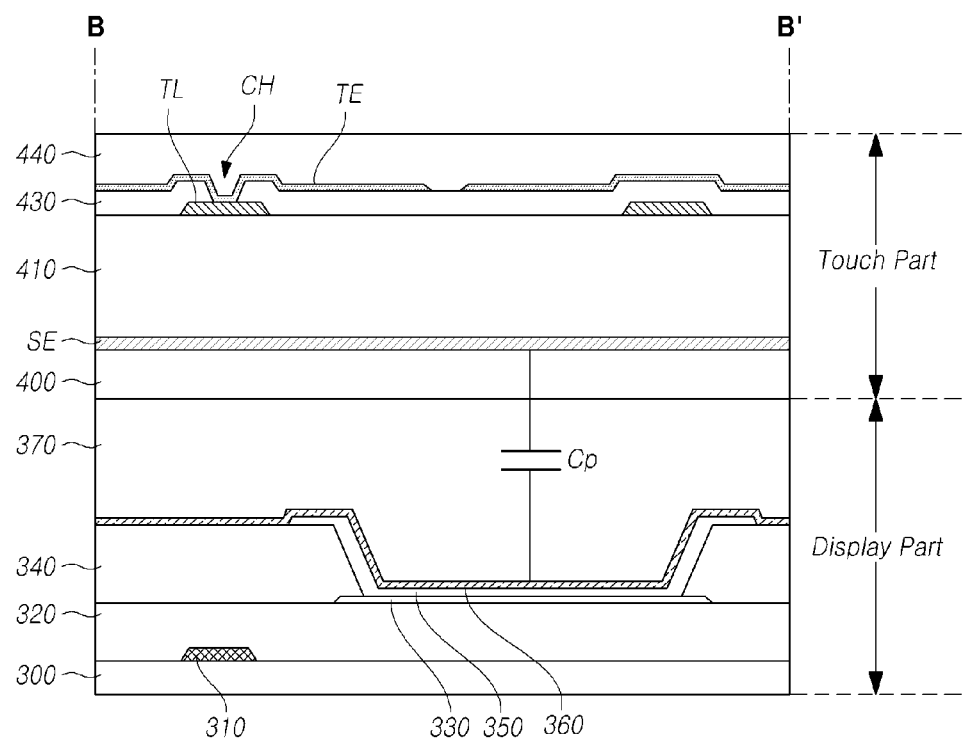

Here, the display electrode may mean an electrode, among electrodes included in the touch display panel 110, located closest to the touch electrodes TE. In FIGS. 4, 5A, and 5B, the display electrode is illustrated as a cathode, i.e. the second electrode 360, by way of example.

The shield electrode SE may be disposed to overlap an area in which the display electrode overlaps the touch electrodes TE.

In addition, the shield electrode SE may overlap an area between two adjacent touch electrodes TE among the plurality of touch electrodes TE.

As illustrated in FIG. 4, the shield electrode may be provided as a bulk electrode between the display electrode and the touch electrodes TE, or may be divided into pieces corresponding to the touch electrodes TE.

In addition, the shield electrode SE may be made of a transparent material or a translucent material, or may be made of the same material as the cathode.

For example, the shield electrode SE may be made of a material (e.g. indium tin oxide (ITO)) having a certain degree of transparency or higher (e.g. 90% or higher) or a translucent material (e.g. AgMg or a mixture including AgMg). In addition, the material of the cathode may be the same as the material of the shield electrode SE.

Alternatively, the shield electrode SE and the cathode may be made of materials having different degrees of transparency. The transparency of the shield electrode SE may be higher than the transparency of the cathode.

In addition, during a period in which a touch driving signal TDS is applied, a shield signal SS corresponding to the touch driving signal TDS may be applied to the shield electrode SE.

Here, the shield signal SS corresponding to the touch driving signal TDS may be a signal having the same frequency and phase as the touch driving signal TDS. In addition, the shield signal SS may be a signal having the same amplitude as the touch driving signal TDS.

Since the shield electrode SE is disposed to overlap the area in which the display electrode overlaps the touch electrodes TE as described above, parasitic capacitance Cp can be prevented from being generated directly between the touch electrodes TE and the display electrode. In addition, parasitic capacitance Cp may be generated between the shield electrode SE, located between the touch electrodes TE overlapping the display electrode, and the display electrode.

In addition, as the shield signal SE is applied to the shield electrode SE during the period in which the touch driving signal TDS is applied to the touch electrodes TE, capacitance may not be generated between the touch electrodes TE and the shield electrode SE.

Accordingly, the shield electrode SE can act to block noise caused by parasitic capacitance Cp that may be generated by the display electrode. In addition, since the shield electrode SE has the shield signal SS, corresponding to the touch driving signal TDS, applied thereto, touch sensing signals TSS received from the touch electrodes TE may not be affected by the shield electrode SE.

Accordingly, the sensitivity of touch sensing signals TSS, received from the touch electrodes TE, may be improved.

In addition, as display noise in touch sensing signals TSS is reduced and the sensitivity of touch sensing signals TSS is improved, the performance of touch sensing enabled by detecting a self-capacitance change in the touch electrodes TE may be improved.

Hereinafter, specific structures in which the shield electrode SE is disposed in the touch display device 100 according to exemplary embodiments will be described with reference to FIGS. 5A to 6C.

Figure 5C:
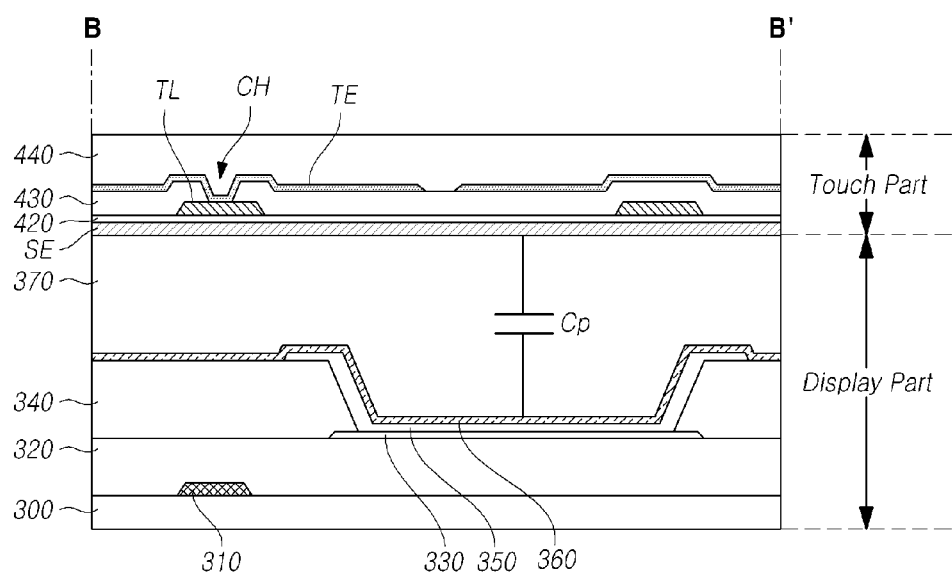

FIGS. 5A to 5C illustrate cross-sectional structures of portion B-B' of the touch display device 100 illustrated in FIG. 4.

FIGS. 5A and 5B illustrate structures respectively including the shield electrode SE disposed in an on-cell structure in which the touch electrode TE is disposed, while FIG. 5C illustrates a structure including the shield electrode SE disposed in an in-cell structure in which the touch electrode TE is disposed.

Referring to FIG. 5A, the shield electrode SE may be disposed on the encapsulation layer 370 of the display part.

In addition, the adhesive layer 400 may be disposed on the shield electrode SE. In addition, the touch substrate 410, the touch electrode TE, the touch line TL, and the like may be disposed on the adhesive layer 400.

That is, the shield electrode SE may be disposed on the encapsulation layer 370 during the processing of the display part. In addition, the shield electrode SE may constitute the touch part, together with the touch substrate 410, the touch electrode TE, the touch lines TL, and the like, attached to the top of the shield electrode SE via the adhesive layer 400.

Alternatively, as illustrated in FIG. 5B, the adhesive layer 400 may be disposed on the encapsulation layer 370 of the display part, and the shield electrode SE may be disposed on the adhesive layer 400.

That is, the shield electrode SE may be disposed in a variety of locations between the touch electrode TE and the display electrode, depending on the fabrication method, convenience, and the like.

In addition, as illustrated in FIG. 5C, the shield electrode SE may be disposed in the in-cell structure in which the touch electrode TE is disposed.

Referring to FIG. 5C, the shield electrode SE may be disposed on the encapsulation layer 370.

In addition, the touch buffer layer 420 may be disposed on the shield electrode SE, and the touch line TL may be disposed on the touch buffer layer 420. Here, the touch buffer layer 420 may serve to insulate the shield electrode SE and the touch line TL from each other.

The touch insulating layer 430, the touch electrode TE, and the touch protective layer 440 may be disposed on the touch line TL.

Accordingly, the touch display device 100 having a touch sensing function, with the shield electrode SE being disposed between the touch electrode TE and the display electrode, can easily be provided.

Since the shield electrode SE is disposed between the second electrode 360, i.e. the display electrode closest to the touch electrode TE, and the touch electrode TE in the display part, parasitic capacitance Cp can be prevented from being generated between the second electrode 360 and the touch electrode TE.

In addition, since parasitic capacitance Cp is generated between the shield electrode SE and the second electrode 360 and the shield electrode SE and the touch electrode TE are set to be equipotential, the shield electrode SE can block display noise to improve the sensitivity of a touch sensing signal TSS received from the touch electrode TE.

Since display noise in the touch sensing signal TSS is reduced and the sensitivity of the touch sensing signal TSS is improved due to the shield electrode SE, the touch electrode TE and the touch line TL can be disposed in a more variety of structures.

Figure 6A:
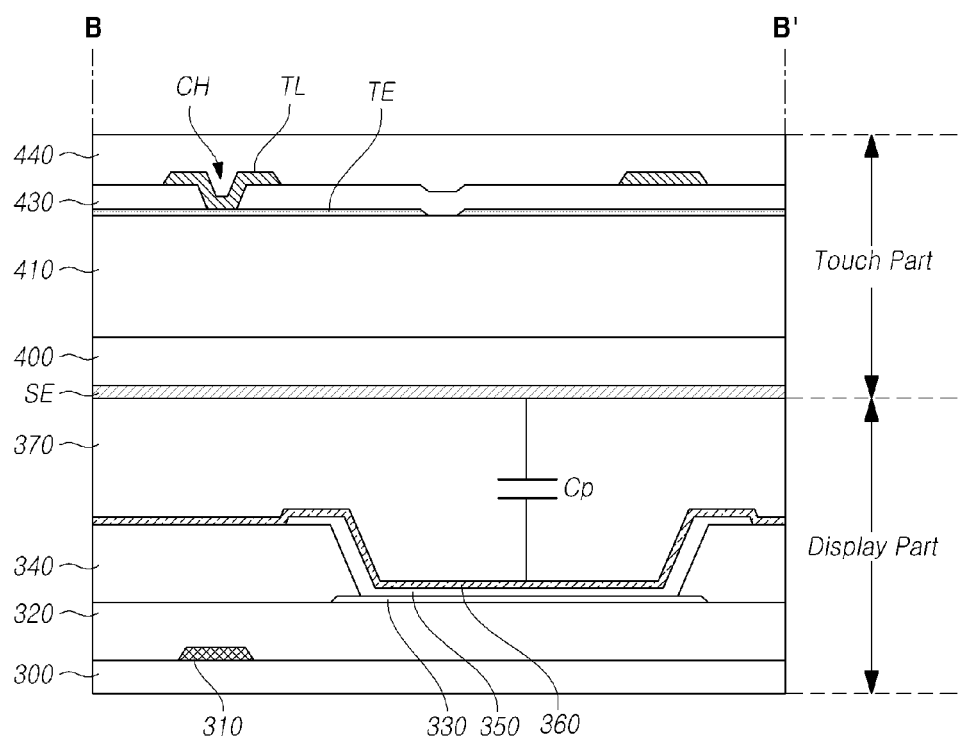
FIGS. 6A to 6C illustrate other exemplary cross-sectional structures of portion B-B' of various touch display devices including those illustrated in FIG. 4.
Figure 6B:
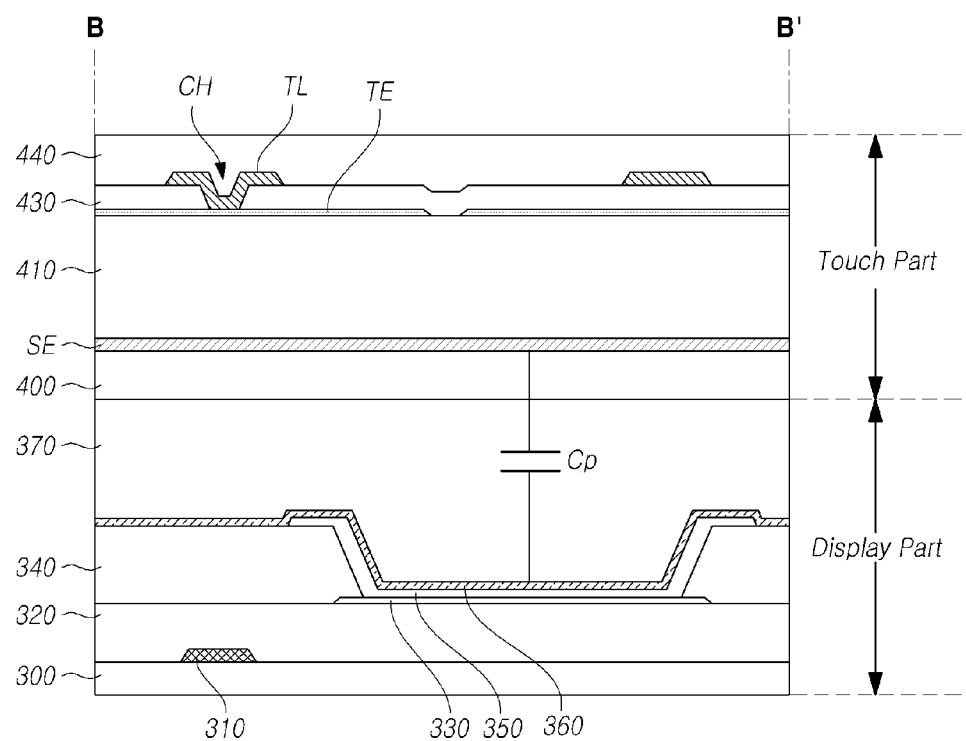
Figure 6C:
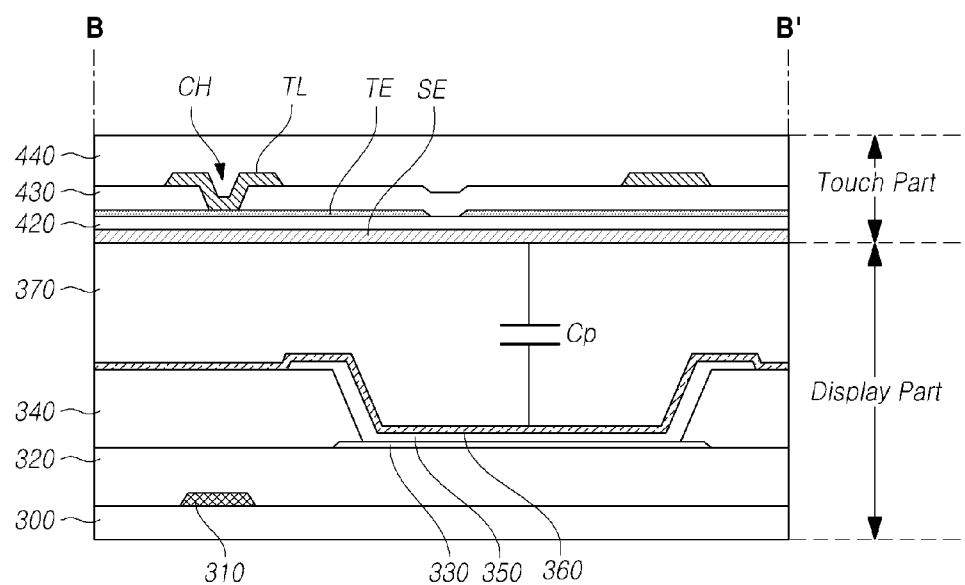

FIGS. 6A to 6C illustrate other cross-sectional structures of portion B-B' of the touch display device 100 illustrated in FIG. 4.

FIGS. 6A and 6B illustrate structures in each of which the shield electrode SE is disposed in an on-cell structure, while FIG. 6C illustrates a structure in which the shield electrode SE is disposed in an in-cell structure.

Referring to FIGS. 6A and 6B, in the touch part, the touch electrode TE is disposed on the touch substrate 410, and the touch insulating layer 430 is disposed on the touch electrode TE. In addition, the touch line TL is disposed on the touch insulating layer 430, and the touch protective layer 440 is disposed on the touch line TL.

The touch line TL may be electrically connected to the touch electrode TE via the contact hole CH provided in the touch insulating layer 430.

Since the shield electrode SE, located below the touch electrode TE, blocks display noise caused by the display electrode, the touch electrode TE may be located closer to the display electrode.

In addition, the touch electrode TE, having a wider area than the touch line TL, may be disposed below the touch line TL, and the touch line TL and the touch electrode TE may be electrically connected to each other via the contact hole CH, such that the contacting between the touch line TL and the touch electrode TE can be more easily performed.

Likewise, in the in-cell structure in which the touch electrode TE is disposed, the touch line TL may be located above the touch electrode TE.

Referring to FIG. 6C, the shield electrode SE is disposed on the encapsulation layer 470, and the touch buffer layer 420 is disposed on the shield electrode SE. In addition, the touch electrode TE may be disposed on the touch buffer layer 420, and the shield electrode SE and the touch electrode TE may be insulated from each other via the touch buffer layer 420.

The touch insulating layer 430 and the touch line TL may be disposed on the touch electrode TE, and the touch line TL may be electrically connected to the touch electrode TE via the contact hole CH provided in the touch insulating layer 430.

Since the shield electrode SE is disposed between the touch electrode and the display electrode to block display noise, the position of the touch electrode TE may be selected more variously. Accordingly, the touch electrode TE and the touch line TL may be disposed in a greater variety of structures, in consideration of the convenience of design and the like.

In addition, the touch display device 100 according to exemplary embodiments may further include a shield line SL to supply a shield signal SS to the shield electrode SE, as required. The shield line SL is disposed to overlap the shield electrode SE and the like.

Figure 7:
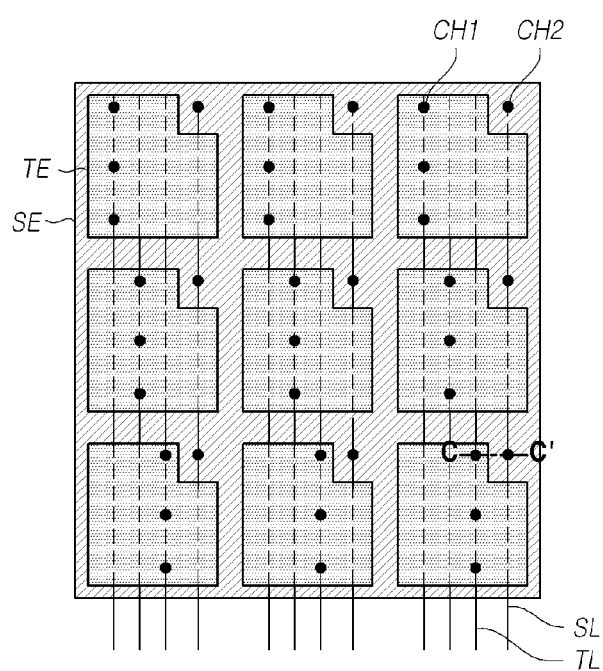
FIG. 7 illustrates another arrangement structure of touch electrodes and a shield electrode in the touch display device according to exemplary embodiments.

FIG. 7 illustrates another arrangement structure of touch electrodes TE and a shield electrode SE in the touch display device 100 according to exemplary embodiments.

Referring to FIG. 7, the touch display device 100 according to exemplary embodiments includes the shield electrode SE disposed between the touch electrode TE and the display electrode. In addition, the touch display device 100 may also include the plurality of touch lines TL electrically connected to the touch electrodes TE, respectively, and a plurality of shield lines SL electrically connected to the shield electrode SE.

Each of the plurality of touch lines TL is electrically connected to a corresponding electrode TE of the touch electrodes TE via at least one first contact hole CH1. In addition, each of the plurality of touch lines TL applies a touch driving signal TDS, output from the touch driver circuit 150, to the corresponding touch electrode TE, and transfers a touch sensing signal TSS to the touch driver circuit 150.

The plurality of shield lines SL are electrically connected to the shield electrode SE via at least one second contact hole CH2. This configuration may allow a shield signal SS, output from the touch driver circuit 150 or an additional driver circuit, to be applied to the shield electrode SE. As illustrated in FIG. 7, the shape or profile of at least a portion of each of the touch electrodes TE may be modified to form the second contact hole CH. Alternatively, the second contact holes CH2 may be formed in the other locations, except for the areas in which the touch electrodes TE are disposed, without the modification of the shape of the touch electrodes TE, such that the shield signal SS can be applied to the shield electrode SE.

The shield lines SL may be disposed on the same layer as the touch lines TL, and may be insulated from the touch lines TL and the touch electrodes TL.

Accordingly, the shield electrode SE may receive the shield signal SS via lines disposed in the periphery of the touch display panel 110, or as illustrated in FIG. 7, via the shield lines SL disposed to overlap the shield electrode SE.

In addition, the shield signal SS may be applied to the shield electrode SE during a period in which the touch driving signal TDS is applied to the touch electrodes TE, such that the shield electrode SE can block display noise without affecting the touch sensing signal TSS.

Figure 8A:
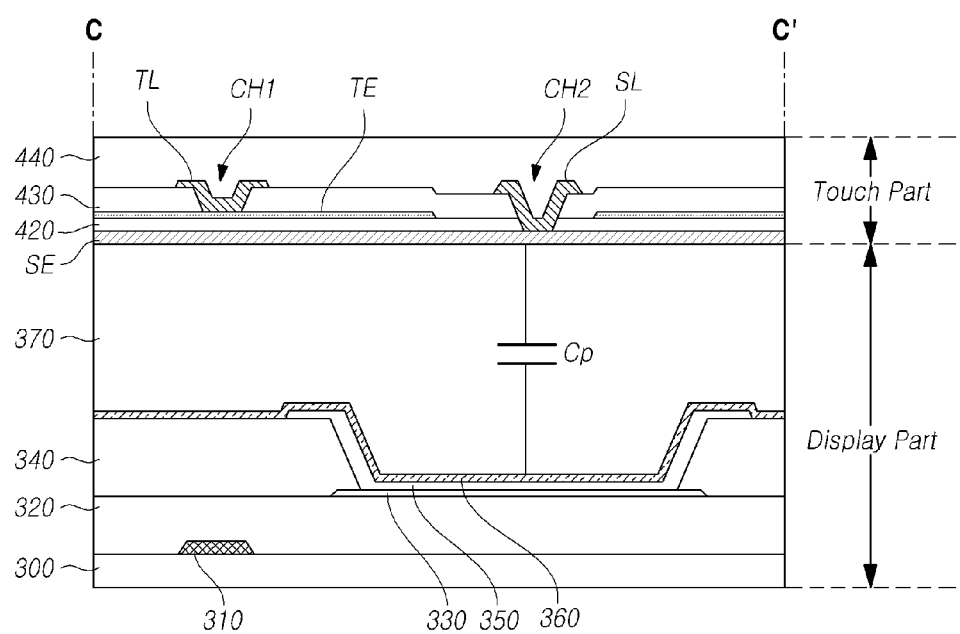
FIGS. 8A and 8B illustrate exemplary cross-sectional structures of portion C-C' of the touch display device illustrated in FIG. 7.
Figure 8B:
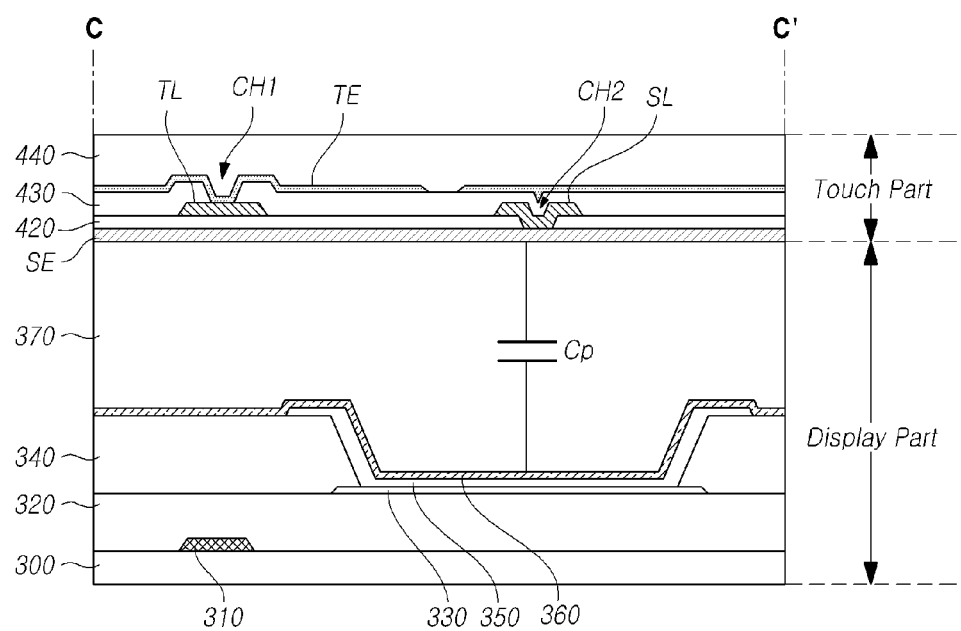

FIGS. 8A and 8B illustrate cross-sectional structures of portion C-C' of the touch display device 100 illustrated in FIG. 7, in each of which the touch electrode TE is disposed in an on-cell structure.

Referring to FIG. 8A, the shield electrode SE is disposed on the encapsulation layer 370, and the touch buffer layer 420 is disposed on the shield electrode SE. In addition, the touch electrode TE is disposed on the touch buffer layer 420, and the touch insulating layer 430 is disposed on the touch electrode TE.

The touch line TL and the shield line SL may be disposed on the touch insulating layer 430, and the touch protective layer 440 may be disposed on the touch line TL and the shield line SL.

Here, the touch line TL and the shield line SL may be disposed on the same layer, and be made of the same material.

In addition, the touch line TL may be electrically connected to the touch electrode TE via the first contact hole CH1, and the shield line SL may be electrically connected to the shield electrode SE via the second contact hole CH2 formed in the touch buffer layer 420 and the touch insulating layer 430.

Accordingly, the shield line SL, electrically connected to the shield electrode SE to apply the shield signal SS to the shield electrode SE, may be easily disposed.

In addition, the touch line TL and the shield line SL may be disposed between the touch electrode TE and the shield electrode SE.

Referring to FIG. 8B, the shield electrode SE is disposed on the encapsulation layer 370, and the touch buffer layer 420 is disposed on the shield electrode SE. In addition, the touch line TL and the shield line SL are disposed on the touch buffer layer 420, and the touch insulating layer 430 is disposed on the touch line TL and the shield line SL. The touch electrode TE is disposed on the touch insulating layer 430.

Accordingly, the touch line TL and the shield line SL may be disposed on the same layer, between the touch electrode TE and the shield electrode SE.

In addition, the touch line TL and the touch electrode TE may be electrically connected to each other via the first contact hole CH1 formed in the touch insulating layer 430, and the shield line SL and the shield electrode SE may be electrically connected to each other via the second contact hole CH2 formed in the touch buffer layer 420.

Since the touch line TL and the shield line SL are disposed between the touch electrode TE and the shield electrode SE as described above, the area of the touch electrode TE to be reduced by the second contact hole CH2 connecting the shield line SL and the shield electrode SE can be minimized.

Although the structures of the touch electrode TE for sensing a touch by detecting a change in self-capacitance have been illustrated in the foregoing exemplary embodiments, the same may be applied to the structures of the touch electrode TE for sensing a touch by detecting a change in mutual capacitance.

Figure 9:
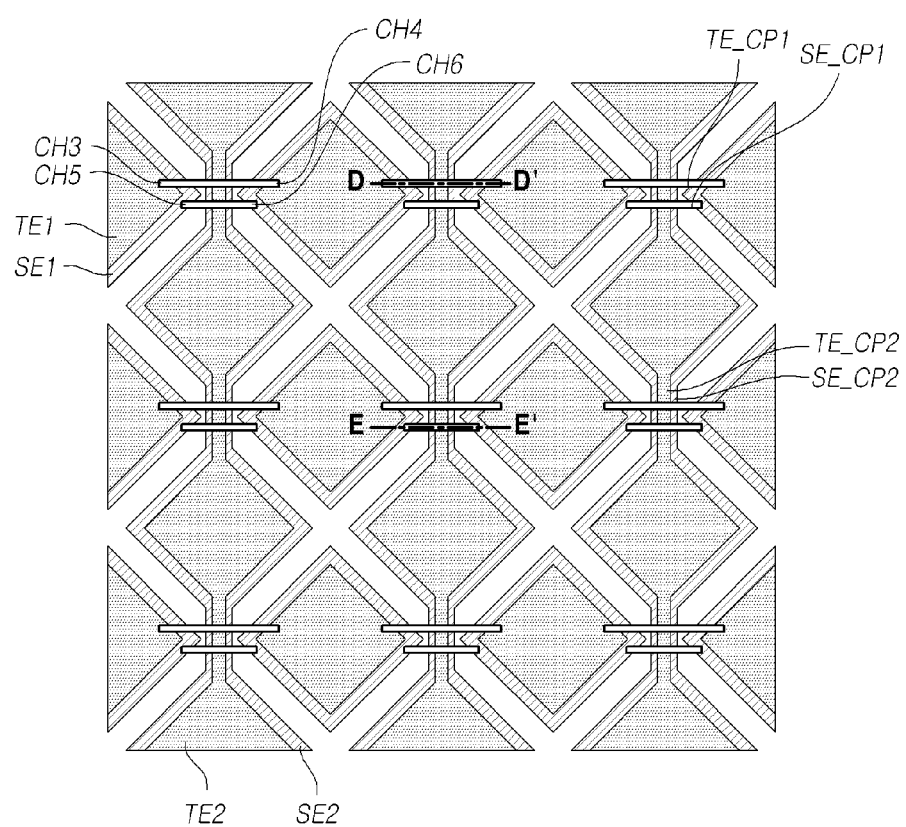
FIG. 9 illustrates another arrangement structure of touch electrodes and shield electrodes in the touch display device according to exemplary embodiments.

FIG. 9 illustrates another arrangement structure of touch electrodes TE and shield electrodes SE in the touch display device 100 according to exemplary embodiments.

Referring to FIG. 9, the touch display device 100 according to exemplary embodiments may include the plurality of touch electrodes TE and the plurality of shield electrodes SE disposed between the plurality of touch electrodes TE and the display electrode.

The plurality of touch electrodes TE may include a plurality of first touch electrodes TE1 connected to each other in a first direction and a plurality of second touch electrodes TE2 connected to each other in a second direction.

In addition, the touch display device 100 may also include a first touch electrode connecting pattern TE_CP1 comprised of one or more pattern elements respectively connecting two adjacent first touch electrodes TE1 among the plurality of first touch electrodes TE1 and a second touch electrode connecting pattern TE_CP2 comprised of one or more pattern elements respectively connecting two adjacent second touch electrodes TE2 among the plurality of second touch electrodes TE2.

Here, the first touch electrode connecting pattern TE_CP1 and the second touch electrode connecting pattern TE_CP2 may be disposed on different layers.

For example, as illustrated in FIG. 9, the pattern elements of the second touch electrode connecting pattern TE_CP2 may be disposed on the same layer as the first touch electrodes TE1 and the second touch electrodes TE2, and respectively connect two adjacent second touch electrodes TE2. In addition, the pattern elements of the first touch electrode connecting pattern TE_CP1 may be disposed on different layers from the first touch electrodes TE1 and the second touch electrodes TE2, and respectively connect two adjacent first touch electrodes TE1 to each other via contact holes CH3 and CH4.

The plurality of shield electrodes SE may include a plurality of first shield electrodes SE1 disposed to correspond to the plurality of first touch electrodes TE1, respectively, and a plurality of second shield electrodes SE2 disposed to correspond to the plurality of second touch electrodes TE2, respectively. The area of the first shield electrode SE1 and the area of the second shield electrode SE2 may be greater than the area of the first touch electrode TE1 and the area of the second touch electrode TE2, respectively.

In addition, the plurality of first shield electrodes SE1 may be connected to each other in the same first direction as the first touch electrodes TE1, and the plurality of second shield electrodes SE2 may be connected to each other in the same second direction as the first touch electrodes TE2.

In addition, the touch display device 100 may also include a first shield electrode connecting pattern SE_CP1 comprised of one or more pattern elements respectively connecting two adjacent first shield electrodes SE1 and a second shield electrode connecting pattern SE_CP2 comprised of one or more pattern elements respectively connecting two adjacent second shield electrodes SE2.

The first shield electrode connecting pattern SE_CP1 and the second shield electrode connecting pattern SE_CP2 may be disposed on the different layers.

For example, as illustrated in FIG. 9, the pattern elements of the second shield electrode connecting pattern SE_CP2 may be disposed on the same layer as the first shield electrodes SE1 and the second shield electrodes SE2, and respectively connect two adjacent second shield electrodes SE2. In addition, the pattern elements of the first shield electrode connecting pattern SE_CP1 may be disposed on different layers from the first shield electrodes SE1 and the second shield electrodes SE2, and respectively connect two adjacent first shield electrodes SE1 to each other via contact holes CH5 and CH6.

Here, some portions of the patterns connecting the shield electrode SE may be disposed to overlap the patterns connecting the touch electrode TE, and other portions of the patterns connecting the shield electrode SE may be disposed on the same layer as overlap the patterns connecting the touch electrode TE.

For example, as illustrated in FIG. 9, the first touch electrode connecting pattern TE_CP1 and the first shield electrode connecting pattern SE_CP1 may be disposed on the same layer, and they may be disposed on separate layers. In addition, the second touch electrode connecting pattern TE_CP2 and the second shield electrode connecting pattern SE_CP2 may be disposed to overlap each other.

Figure 10A:
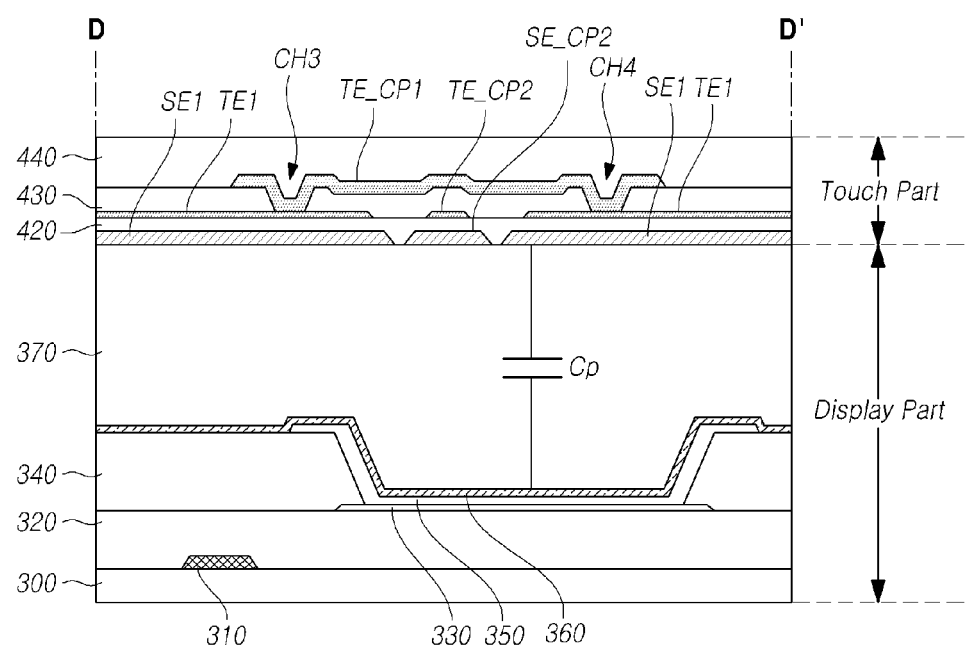
FIG. 10A illustrates the cross-sectional structure of portion D-D' of the touch display device illustrated in FIG. 9.
Figure 10B:
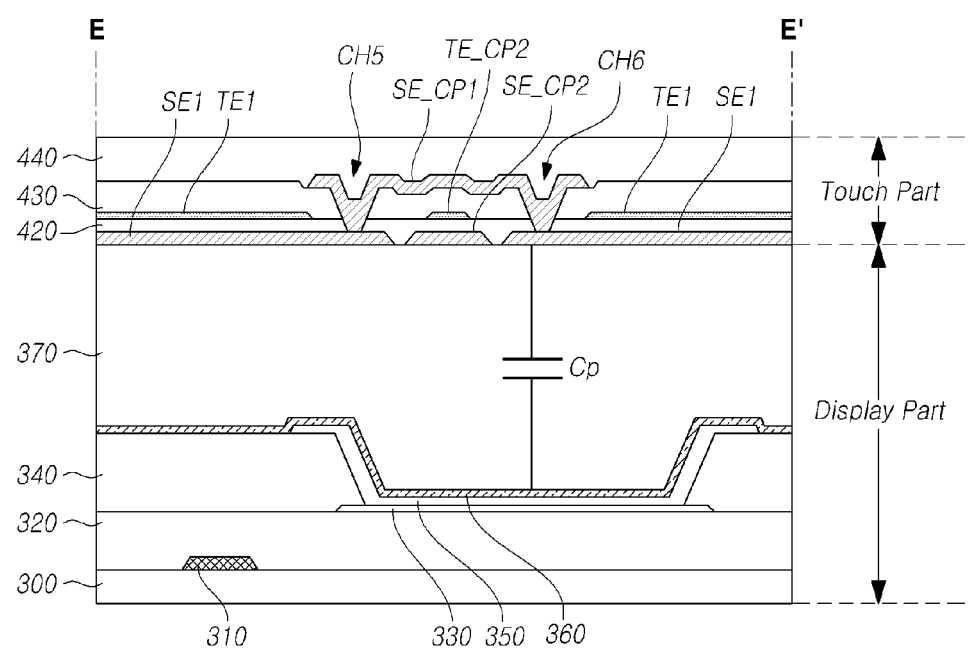
FIG. 10B illustrates the cross-sectional structure of portion E-E' of the touch display device illustrated in FIG. 9.

FIGS. 10A and 10B illustrate cross-sectional structures of portions of the touch display device 100 illustrated in FIG. 9, in which the touch electrode connecting patterns TE_CP and the shield electrode connecting patterns SE_CP are disposed.

In FIGS. 10A and 10B, FIG. 10A illustrates the cross-sectional structure of portion D-D' in which the first touch electrode connecting pattern TE_CP1 is disposed, while FIG. 10B illustrates the cross-sectional structure of portion E-E' in which the first shield electrode connecting pattern SE_CP1 is disposed.

Referring to FIG. 10A, the first shield electrodes SE1 and the second electrodes SE2 are disposed on the encapsulation layer 370. In addition, the second shield electrode connecting pattern SE_CP2 connecting two adjacent second shield electrodes SE2 is disposed on the encapsulation layer 370.

The touch buffer layer 420 is disposed on the first shield electrodes SE1 and the second shield electrodes SE2. The first touch electrodes TE1 and the second touch electrodes TE2 are disposed on the touch buffer layer 420. In addition, the second touch electrode connecting pattern TE_CP2 connecting two adjacent second touch electrodes TE2 is disposed on the touch buffer layer 420.

The touch insulating layer 430 is disposed on the first touch electrodes TE1 and the second touch electrodes TE2, and the first touch electrode connecting pattern TE_CP1 is disposed on the touch insulating layer 430.

The pattern elements of the first touch electrode connecting pattern TE_CP1 may respectively connect two adjacent first touch electrodes TE1 to each other via the third contact hole CH3 and the fourth contact hole CH4 formed in the touch insulating layer 430.

The touch protective layer 440 is disposed on the first touch electrode connecting pattern TE_CP1. The first shield electrode connecting pattern SE_CP1 may be disposed on the same layer as the first touch electrode connecting pattern TE_CP1.

Referring to FIG. 10B, the first shield electrode connecting pattern SE_CP1 is disposed on the touch insulating layer 430. In addition, the pattern elements of the first shield electrode connecting pattern SE_CP1 may respectively connect two adjacent first shield electrodes SE1 to each other via the fifth contact hole CH5 and the sixth contact hole CH6 formed in the touch buffer layer 420 and the touch insulating layer 430.

Since the first shield electrodes SE1 and the second shield electrodes SE2 are disposed in positions corresponding to the first touch electrodes TE1 and the second touch electrodes TE2 as described above, parasitic capacitance Cp between the touch electrode TE and the display electrode can be prevented, and the touch sensing signal TSS can be protected from display noise.

In addition, since the first shield electrodes SE1 and the second shield electrodes SE2 are disposed using the same connecting structures as those of the first touch electrodes TE1 and the second touch electrodes TE2, touch driving in which display noise is blocked using the shield electrode SE can be provided.

Figure 11:
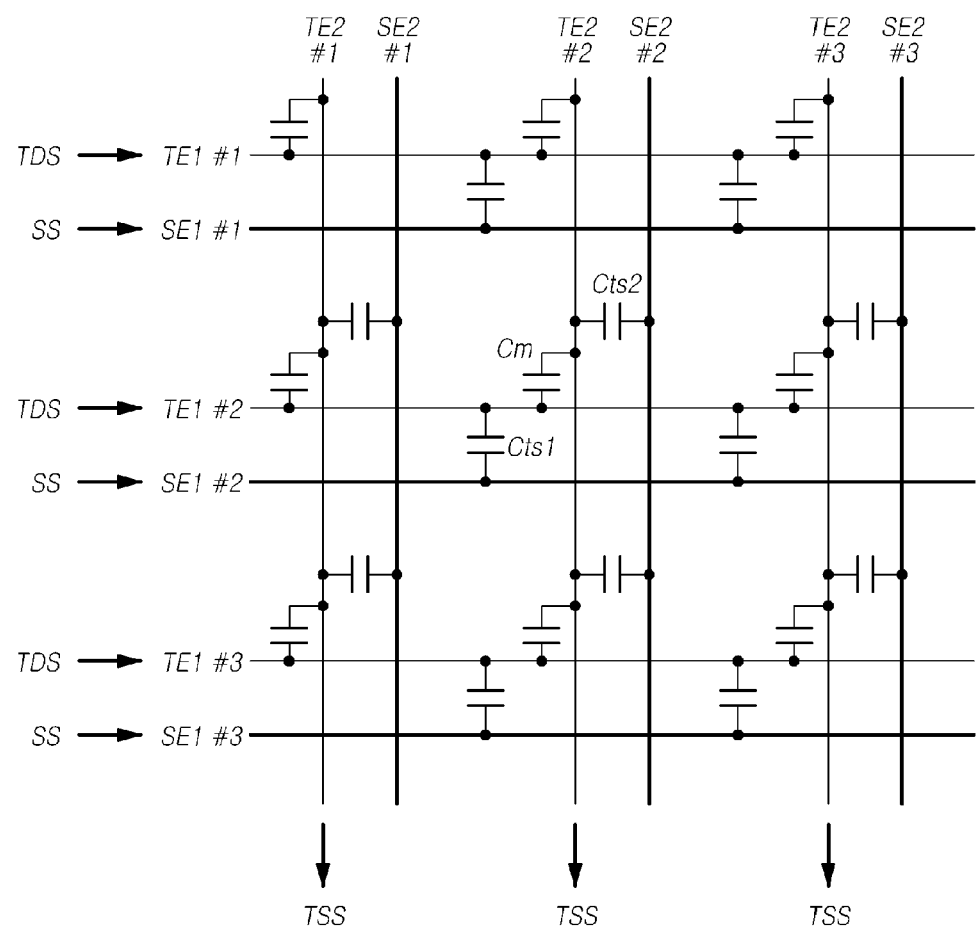
FIGS. 11 and 12 illustrate a driving method of the touch display device illustrated in FIG. 9.
Figure 12:
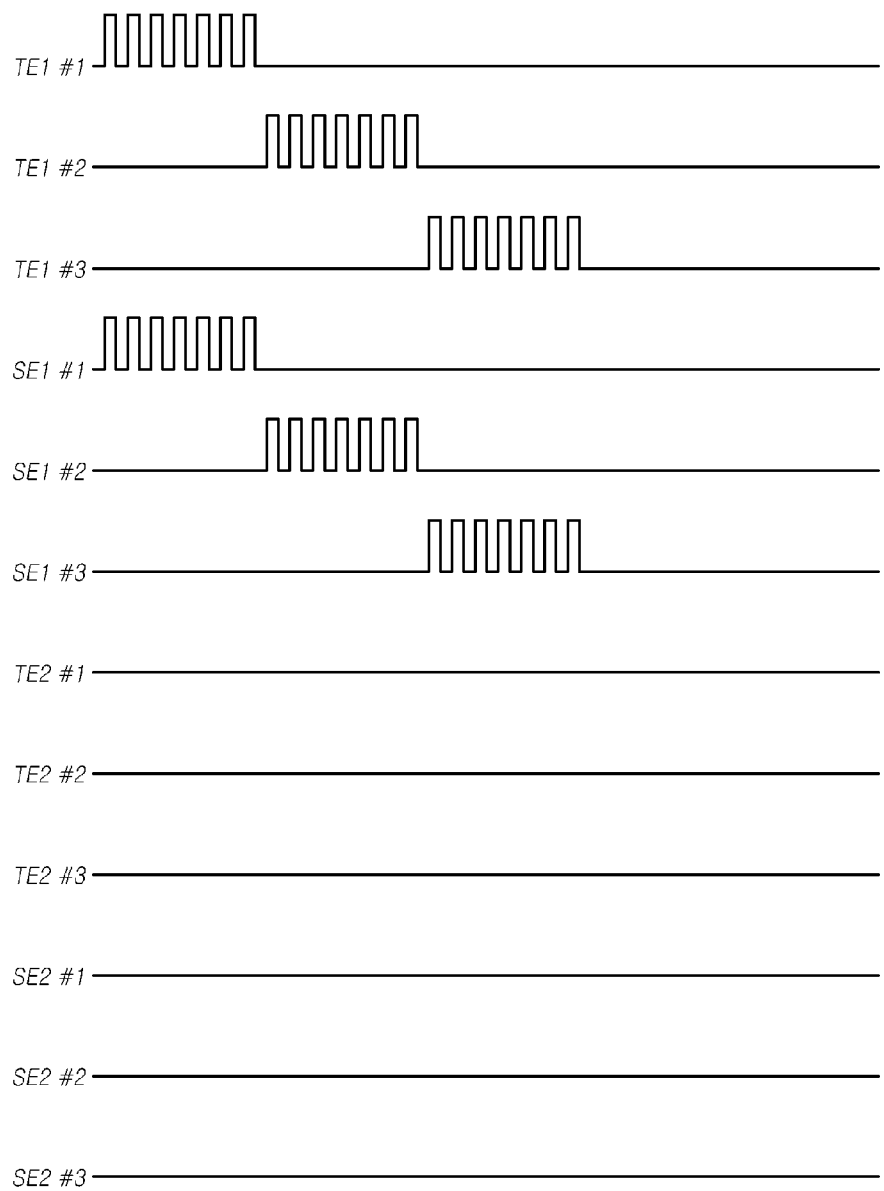

FIGS. 11 and 12 illustrate a driving method of the touch display device 100 illustrated in FIG. 9, in which a touch is sensed by detecting mutual capacitance between the first touch electrodes TE1 and the second touch electrodes TE2.

Referring to FIGS. 11 and 12, the touch driver circuit 150 outputs a touch driving signal TDS to the first touch electrodes TE1 and outputs a shield signal SS, corresponding to the touch driving signal TDS, to the first shield electrodes SE1.

In addition, the touch driver circuit 150 controls the second touch electrodes TE2 and the second shield electrode SE2 to maintain the same constant voltage state. For example, the second touch electrodes TE2 and the second shield electrode SE2 may maintain a touch sensing reference voltage applied thereto.

Since the corresponding signals are applied to the first touch electrodes TE1 and the second shield electrodes SE1 corresponding to the first touch electrodes TE1 as described above, signal delay can be prevented by reducing or removing capacitance Cts1 between the first touch electrodes TE1 and the first shield electrodes SE1.

In addition, since the corresponding electrodes, i.e. the second touch electrodes TE2 and the second shield electrodes SE2, remain equipotential, signal delay can be prevented by reducing or removing capacitance Cts2 between the second touch electrodes TE2 and the second shield electrodes SE2.

The touch driver circuit 150 may perform touch sensing based on mutual capacitance by receiving touch sensing signals TSS from the second touch electrodes TE2 and detecting mutual capacitance between the first touch electrodes TE1 and the second touch electrodes TE2.

Accordingly, display noise can be prevented from being caused by parasitic capacitance Cp generated by the display electrode, so that touch sensing based on a change in the mutual capacitance of the touch electrodes TE can be performed.

In addition, due to the arrangement structure of the touch electrodes TE and the shield electrodes SE as described above, touch sensing based on a change in the self-capacitance of the touch electrodes TE can be performed.

Figure 13:
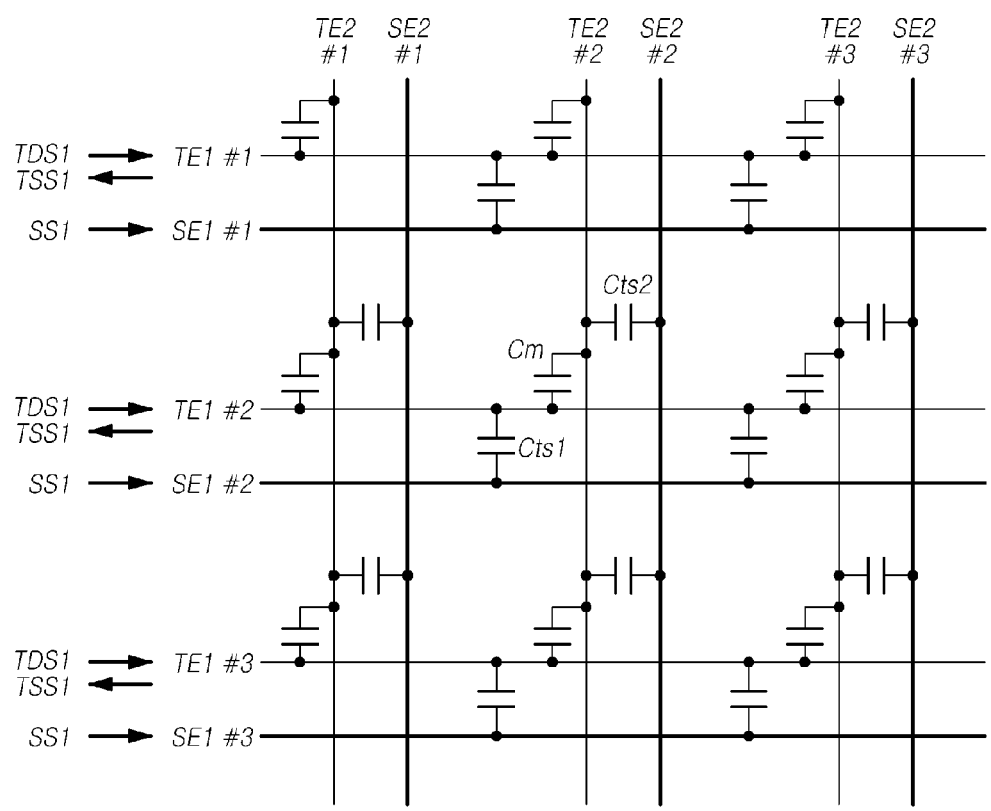
FIGS. 13 to 15 illustrate another driving method of the touch display device illustrated in FIG. 9.
Figure 14:
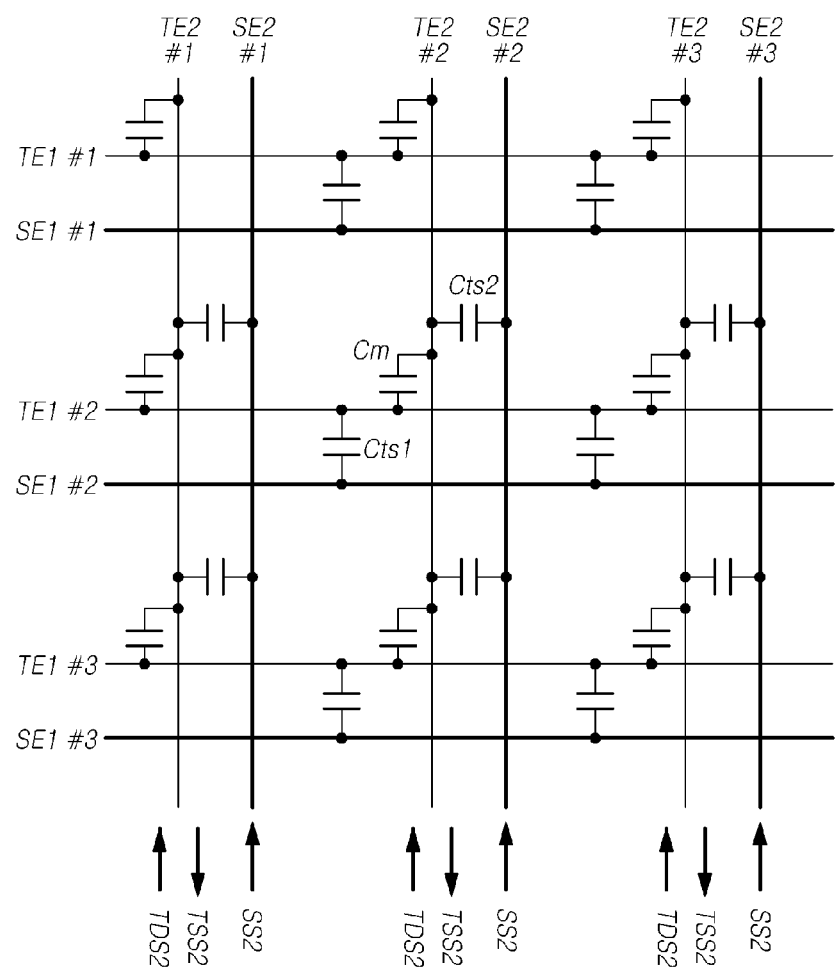
Figure 15:
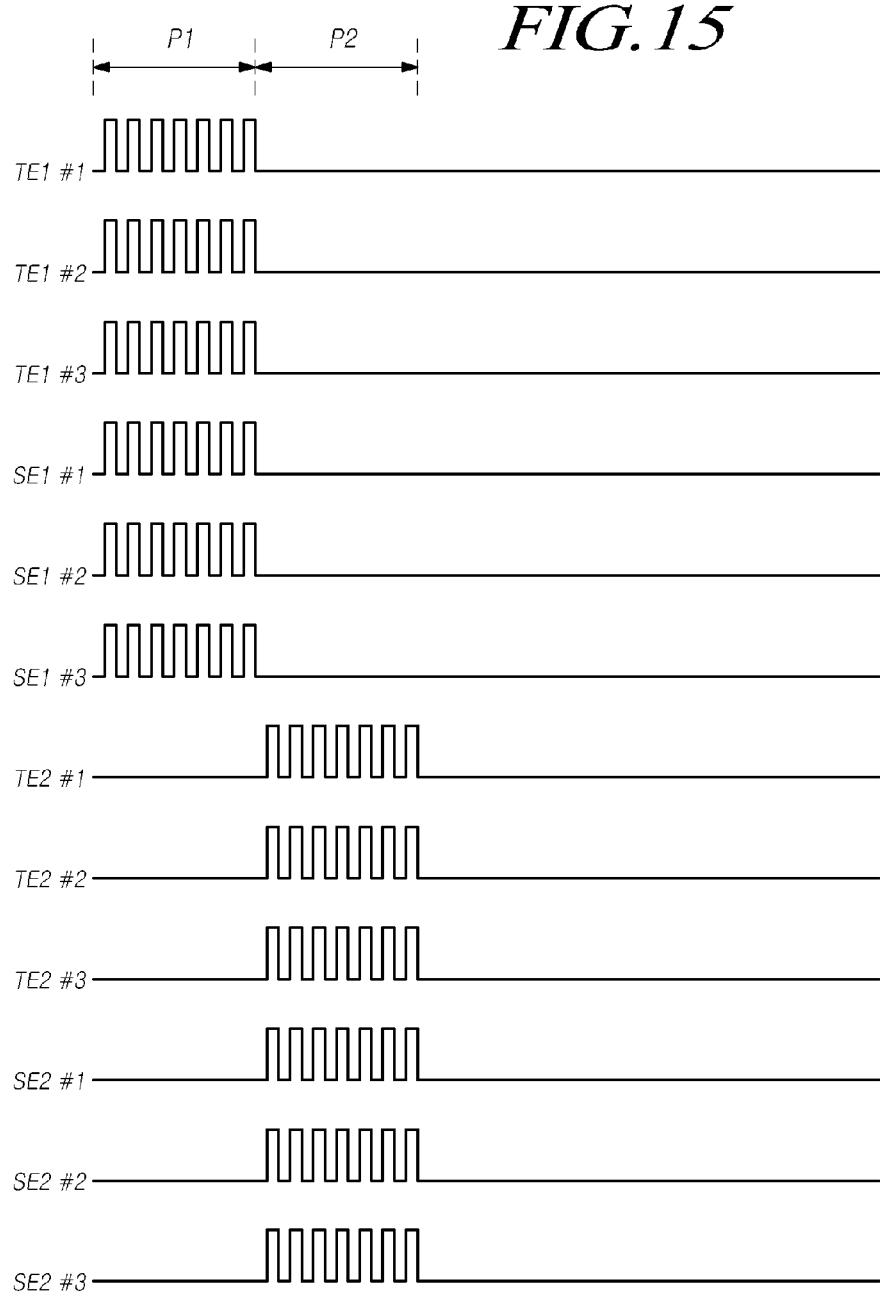

FIGS. 13 to 15 illustrate another driving method of the touch display device 100 illustrated in FIG. 9, in which a touch is sensed by detecting self-capacitance of the first touch electrodes TE1 and self-capacitance of the second touch electrodes TE2.

Referring to FIGS. 13 and 15, during a first period P1, the touch driver circuit 150 outputs a first driving signal TDS1 to the first touch electrodes TE1, and outputs a first shield signal SS1, corresponding to the first driving signal TDS1, to the first shield electrodes SE1.

In addition, the touch driver circuit 150 may detect a change in the self-capacitance of the first touch electrodes TE1 by receiving first touch sensing signals TSS1 from the first touch electrodes TE1.

Here, the first shield electrodes SE1 are disposed to correspond to the first touch electrodes TE1 to block display noise, so that the sensitivity of detection of a change in the self-capacitance of the first touch electrodes TE1 can be improved.

Referring to FIGS. 14 and 15, during a second period P2, the touch driver circuit 150 outputs a second driving signal TDS2 to the second touch electrodes TE2, and outputs a second shield signal SS2, corresponding to the second driving signal TDS2, to the second shield electrodes SE2.

In addition, the touch driver circuit 150 may detect a change in the self-capacitance of the second touch electrodes TE2 by receiving second touch sensing signals TSS2 from the second touch electrodes TE2.

Likewise, the second shield electrodes SE2 serve to block display noise, so that the sensitivity of detection of a change in the self-capacitance of the second touch electrodes TE2 can be improved.

The touch driver circuit 150 can sense a user's touch made to the touch display panel 110, based on a change in the self-capacitance of the first touch electrodes TE1, detected in the first period P1, and a change in the self-capacitance of the second touch electrodes TE2, detected in the second period P2.

Since display noise can be blocked using the first shield electrodes SE1 and the second shield electrodes SE2, touch sensing can be performed by detecting the self-capacitance of each of the first touch electrodes TE1 and the second touch electrodes TE2.

In addition, since both the touch sensing function based on the detection of self-capacitance and the touch sensing function based on the detection of mutual capacitance are provided, touch sensing can be performed based on self-capacitance sensing and mutual capacitance sensing, as required.

Figure 16:
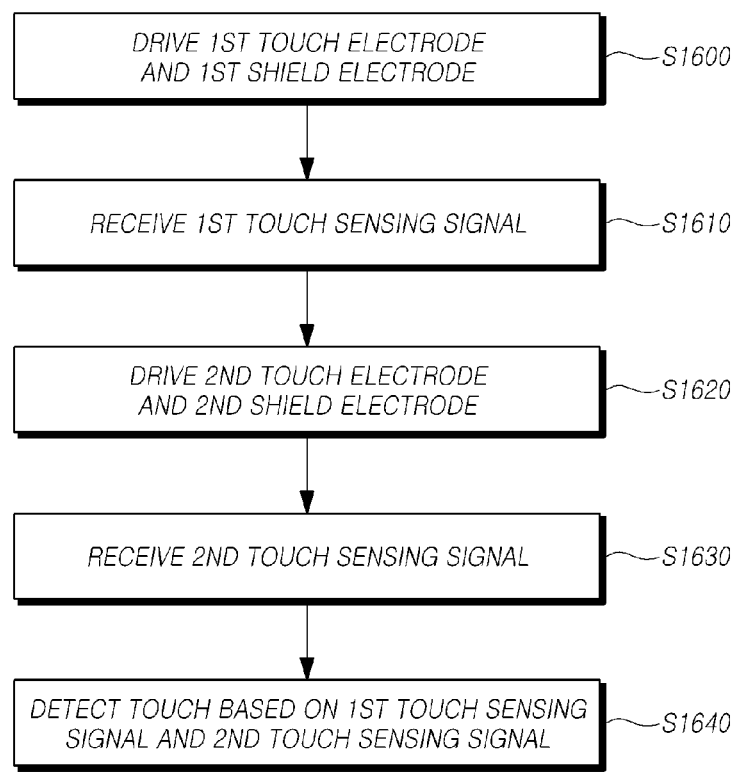
FIG. 16 illustrates a driving method of the touch driver circuit according to exemplary embodiments.

FIG. 16 illustrates a driving method of the touch driver circuit 150 according to exemplary embodiments.

Referring to FIG. 16, in S1600, the touch driver circuit 150 drives the first touch electrodes TE1 and the first shield electrodes SE1 corresponding to the first touch electrodes TE1 during a first period P1. In S1610, the touch driver circuit 150 receives first touch sensing signals TSS1 from the first touch electrodes TE1.

In S1620, the touch driver circuit 150 drives the second touch electrodes TE2 and the second shield electrodes SE2 corresponding to the second touch electrodes TE2 during a second period P2. In S1630, the touch driver circuit 150 receives second touch sensing signals TSS2 from the second touch electrodes TE2.

In S1640, the touch driver circuit 150 detects a user's touch based on the first touch sensing signals TSS1 and the second touch sensing signals TSS2.

In addition, the touch driver circuit 150 may perform touch sensing based on a change in mutual capacitance by simultaneously driving the first touch electrodes TE1 and the second touch electrodes TE2. Here, the first shield electrodes SE1 and the second shield electrodes SE2 may be driven to correspond to the first touch electrodes TE1 and the second touch electrodes TE2.

As set forth above, according to exemplary embodiments, the shield electrodes SE are disposed between the display electrode and the touch electrodes TE, and a signal, corresponding to a signal applied to the touch electrodes TE, is applied to the shield electrode SE, so that the shield electrodes SE can block display noise to improve the sensitivity of touch sensing signals TSS received from the touch electrodes TE.

In addition, the removal of display noise can improve the accuracy of detection of a change in the self-capacitance of the touch electrodes TE, thereby improving touch sensing performance based on the change in the self-capacitance.

In addition, in the touch display panel 110 and the touch display device 100, both the touch sensing function based on the detection of self-capacitance and the touch sensing function based on the detection of mutual capacitance can be provided. Accordingly, touch sensing can be provided, based on at least one of the detection of self-capacitance and the detection of mutual capacitance, as required.

The foregoing descriptions and the accompanying drawings have been presented in order to explain certain principles of the present disclosure. A person having ordinary skill in the art to which the present disclosure relates could make various modifications and variations without departing from the principle of the present disclosure. The foregoing embodiments disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

What is claimed is:

1. A touch display device comprising:
   a display electrode configured to receive a display driving voltage;
   an encapsulation layer located above the display electrode;
   a plurality of touch electrodes, located above the encapsulation layer, configured to receive a touch driving signal;
   a shield electrode, disposed between the encapsulation layer and the plurality of touch electrodes, configured to receive a shield signal corresponding to the touch driving signal;
   a plurality of touch lines disposed over the shield electrode, wherein the plurality of touch lines are electrically connected to the plurality of touch electrodes; and at least one shield line disposed on a same layer as the plurality of touch lines, wherein the at least one shield line is insulated from the plurality of touch lines and the at least one shield line is electrically connected to at least one shield electrode.

2. The touch display device according to claim 1, wherein the shield electrode has a first area and the display electrode has a second area, and the plurality of touch electrodes have a third area, and wherein the first area overlaps the second area, and the second area overlaps the third area.

3. The touch display device according to claim 1, wherein the shield electrode overlaps at least a portion of an area between two adjacent touch electrodes among the plurality of touch electrodes.

4. The touch display device according to claim 1, wherein the display electrode, the shield electrode, and the plurality of touch electrodes are insulated from each other.

5. The touch display device according to claim 1, wherein the plurality of touch electrodes comprise a plurality of first touch electrodes in a first direction and a plurality of second touch electrodes in a second direction, wherein the second direction intersects the first direction, and the shield electrode comprises a plurality of first shield electrodes in a third direction wherein the third direction corresponds with the first direction and a plurality of second shield electrodes in a fourth direction, wherein the fourth direction corresponds with the second direction.

6. The touch display device according to claim 5, wherein a first area including the plurality of first shield electrodes is greater than a second area including the plurality of first touch electrodes, and a third area including the plurality of second shield electrodes is greater than a fourth area including the plurality of second touch electrodes.

7. The touch display device according to claim 5, further comprising:

a first touch electrode connecting pattern including at least one first pattern element connecting the plurality of first touch electrodes;

a second touch electrode connecting pattern including at least one second pattern element connecting the plurality of second touch electrodes;

a first shield electrode connecting pattern including at least one third pattern element connecting the plurality of first shield electrodes; and a second shield electrode connecting pattern including at least one fourth pattern element connecting the plurality of second shield electrodes, wherein the first touch electrode connecting pattern and the first shield electrode connecting pattern are disposed on the same layer; and at least a portion of the second touch electrode connecting pattern overlaps at least a portion of the second shield electrode connecting pattern.

8. The touch display device according to claim 5, wherein, during a first period, the touch driving signal is applied to at least one first touch electrode among the plurality of first touch electrodes, and the shield signal is applied to at least one first shield electrode among the plurality of first shield electrodes, and during a second period, the touch driving signal is applied to at least one second touch electrode among the plurality of second touch electrodes, and the shield signal is applied to at least one second shield electrode among the plurality of second shield electrodes.

9. The touch display device according to claim 1, further comprising:

a touch part including the plurality of touch electrodes and the shield electrode; and a display part including the display electrode and the encapsulation layer, wherein the shield electrode and the display part form an in-cell structure.

* * * * *